(12) United States Patent
Ozawa

(10) Patent No.: US 6,915,525 B2
(45) Date of Patent: Jul. 5, 2005

(54) METHOD AND APPARATUS FOR CONTROLLING SET-TOP BOX HARDWARE AND SOFTWARE FUNCTIONS

(75) Inventor: Toshiro Ozawa, San Diego, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 962 days.

(21) Appl. No.: 09/783,255

(22) Filed: Feb. 14, 2001

(65) Prior Publication Data

US 2001/0049718 A1 Dec. 6, 2001

Related U.S. Application Data

(60) Provisional application No. 60/197,233, filed on Apr. 14, 2000, provisional application No. 60/197,848, filed on Apr. 14, 2000, and provisional application No. 60/237,570, filed on Oct. 3, 2000.

(51) Int. Cl.[7] .................................................. G06F 9/44
(52) U.S. Cl. ...................................................... 719/328
(58) Field of Search ................................. 719/328, 330, 719/310; 709/203, 220, 230, 217

(56) References Cited

U.S. PATENT DOCUMENTS

| | | | | |
|---|---|---|---|---|
| 5,218,699 | A | * | 6/1993 | Brandle et al. ............. 719/328 |
| 5,491,800 | A | * | 2/1996 | Goldsmith et al. ......... 709/221 |
| 5,532,753 | A | * | 7/1996 | Buchner et al. ............. 725/56 |
| 5,682,534 | A | * | 10/1997 | Kapoor et al. .............. 719/328 |
| 5,956,483 | A | * | 9/1999 | Grate et al. ................. 709/203 |
| 6,112,246 | A | * | 8/2000 | Horbal et al. ............... 709/230 |
| 6,119,166 | A | * | 9/2000 | Bergman et al. ............ 709/232 |
| 6,195,694 | B1 | * | 2/2001 | Chen et al. ................. 709/220 |
| 6,453,259 | B1 | * | 9/2002 | Infiesto ....................... 702/122 |
| 6,631,403 | B1 | * | 10/2003 | Deutsch et al. ............. 709/217 |
| 6,675,385 | B1 | * | 1/2004 | Wang .......................... 725/39 |
| 6,718,399 | B1 | * | 4/2004 | Chernick et al. ............ 719/330 |
| 6,754,904 | B1 | * | 6/2004 | Cooper et al. ................ 725/32 |
| 6,760,601 | B1 | * | 7/2004 | Suoknuuti et al. .......... 455/557 |
| 2002/0010932 | A1 | * | 1/2002 | Nguyen et al. ............... 725/51 |

OTHER PUBLICATIONS

Y. Tomari, et al, "Design and Implentation of Internet–TV", IEEE, 1997, pp. 953–960.*

H. Ju, et al, "An efficient and lightweight embedded Web server for Web–based network element management", Int. J. Network Mgmt, 2000, 10:261–275.*

* cited by examiner

*Primary Examiner*—Sue Lao
(74) *Attorney, Agent, or Firm*—Miller Patent Services; Jerry A. Miller

(57) ABSTRACT

A method and apparatus for controlling set-top box hardware and software functions. An HTTP microserver is used to intercept HTTP requests for access to local devices and software. When the HTTP microserver receives a URL from the TCP/IP network stack, it directs instructions to an appropriate interface module that in turn generates an API call for an appropriate middleware module. The middleware module may then appropriately control a lower level software module to effect a software function or to drive hardware.

37 Claims, 3 Drawing Sheets

METHOD AND APPARATUS FOR CONTROLLING SET-TOP BOX HARDWARE AND SOFTWARE FUNCTIONS

CROSS REFERENCE TO RELATED DOCUMENTS

This application is related to and claims priority benefit of U.S. provisional patent application Ser. No. 60/197,233, filed Apr. 14, 2000 to Pedlow, Jr. et al. entitled "Cable Modem Set-Top Box", U.S. provisional patent application Ser. No. 60/197,848, filed Apr. 14, 2000 to Scanlan entitled "A User Interface for a Set-Top Box", and U.S. provisional patent application Ser. No. 60/237,570, filed Oct. 3, 2000 to Toshiro Ozawa entitled "Browser-to-Middleware Interface Using HTTP Microserver", which are hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of television set-top boxes. More particularly, this invention relates to television set-top boxes using a browser interface and to a method and apparatus of controlling various hardware and software set-top box functions through the browser.

BACKGROUND OF THE INVENTION

Television set-top boxes are used to provide tuning capabilities for cable and satellite television systems. While these devices still provide that fundamental function, digital set-top boxes now often incorporate powerful computers in the latest generation of set-top boxes. With such computers available, it is now possible to expand the usefulness of the television set-top box beyond that of merely providing tuning functions for cable and satellite systems. Many set-top boxes now provide users with the ability to navigate the Internet using their television sets rather than a computer.

An on-screen user interface (UI) is commonly used with televisions and television set-top boxes for cable and satellite television systems to support numerous features. Features such as menus of favorite channels, locks and limits, timed recording, etc. as well as electronic program guides, pay-per-view (PPV) or video-on-demand (VOD) and other menus and guides are typically provided through such a user interface. In most instances, the user interface screens provided by televisions and television set-top boxes are bit map graphics with all of the behavior (navigation, state transition, etc.) implemented as software programs. Such programs are often coded in the "C" programming language or a variation thereof.

As the functionality of the user interface increases, the user interface structure becomes more complicated and the amount of coding required to support the on-screen user interface increases. Moreover, the amount of memory required by the graphics images grows and may become a cost issue due to the need to provide more memory within the device. In addition, even minor changes to the user interface specification generally require a code change making the design of such user interfaces extremely difficult to modify and inflexible.

In order to ameliorate these problems, some set-top boxes are being designed with Internet access capability. HTML (Hypertext Markup Language) user interface pages and a web browser are used to provide the user interface. This approach provides the advantages of reduced memory size to store user interface screens since HTML files are small compared with bit map graphics, flexibility to adopt changes since changing the user interface page design only requires changing the HTML files, and ease of creating a menu structure by using dynamic links. However, these advantages can be overshadowed by the disadvantages that the browser itself has a large memory footprint. Also, since the browser is optimized for Internet access, accessing local functions are not generally accommodated.

HTML by its very nature is designed to protect the resources of client computer from the outside. It is generally not possible to create an HTML file so that the loading of the file will directly access software outside the browser. In the case of an electronic programming guide, for example, it is easy to display a program guide page written in HTML but difficult to tune a channel by selecting a button on the program guide that requires access to local functions inside the set-top box.

In order to accommodate such functions requiring access to local resources within the set-top box, the interface between the browser and the remaining set-top box can be customized within the browser. This can be accomplished, for example, by defining special URLs that are trapped by the browser to call functions to lower level software (such as middleware or device drivers) before they are processed as normal URLs by sending an HTTP request to a server, for example. The special URL can be described as follows:

internal:function?<parameter1>value</parameter1><parameter2>value2</parameter2>

In this example the key word "internal" is trapped by the browser and the remainder of the string is translated to an internal function with two parameters. However, this solution also has drawbacks. Due to the requirement of modifying the browser source code, which is often produced by another party, in-depth knowledge of the code and access to the code is required. In addition, the special URL code required to implement this modification is outside the HTML standard. Finally, one URL is needed for each function to be accessed. For each URL addition the entire browser software generally requires recompiling.

An HTTP Microserver is sometimes provided as a part of a real time operating system. Such HTTP Microservers function in a manner similar to any other HTTP Server and are conventionally used to provide for remote system setup and diagnostics to permit access to internal API calls from outside computers via a TCP/IP network. Sometimes HTTP Microservers are also used to provide a display mechanism for a device that normally has no display of its own. Thus, a personal computer with a browser can be used to access a microserver on the device to monitor status or change settings. This function is used on devices such as printers and routers. In summary, HTTP Microservers conventionally provide the ability to access functionality from the outside of a device.

SUMMARY OF THE INVENTION

The present invention relates generally to set-top boxes. Objects, advantages and features of the invention will become apparent to those skilled in the art upon consideration of the following detailed description of the invention.

In one embodiment of the present invention a method and apparatus for controlling set-top box hardware and software functions uses an HTTP microserver to intercept HTTP requests for access to local devices and software. When the HTTP microserver receives a URL from the TCP/IP network stack, it directs instructions to an appropriate interface module that in turn generates an API call for an appropriate middleware module. The middleware module may then appropriately control a lower level software module to effect a software function or to drive hardware.

In accordance with an embodiment consistent with the present invention, a method of controlling local hardware or software using a browser includes: directing an HTTP request from a browser to a local HTTP microserver having an IP address; at the HTTP microserver, parsing the HTTP request to identify a target interface module, and directing the HTTP request to the target interface module; and at the target interface module, generating an API call from the HTTP request.

Another method, consistent with the present invention, of controlling local hardware or software using a browser includes: directing a request from a browser to a local microserver having an address; at the microserver, parsing the request to identify a target interface module, and directing the request to the target interface module; and at the target interface module, generating an application call from the request.

In another embodiment, a television set-top box consistent with an embodiment of the invention includes a programmed processor. A browser software segment runs on the programmed processor. A user interface software segment also runs on the programmed processor and receives a user command to select a link using the browser software segment. A network stack receives messages directed to an IP address from the browser software segment in response to the user command selecting a link, and issues an HTTP request in response thereto directed to the IP address. A middleware software module also runs on the programmed processor. An HTTP microserver has an IP address and runs as a software segment on the programmed processor. The HTTP microserver has an interface module that interfaces with the middleware software module by issuing an API (Application Program Interface) call to the middleware software module in response to the HTTP request, the API call implementing the user command.

In another exemplary embodiment, a television set-top box includes a programmed processor. A browser software segment runs on the programmed processor. A user interface software segment also runs on the programmed processor and receives user commands to select a link using the browser software segment. A network stack receives messages directed to an IP address from the browser software segment in response to user commands that select selecting links, and issues HTTP requests in response thereto directed to the IP address. A plurality of middleware software modules also run on the programmed processor. An HTTP microserver having an IP address also runs as a software segment on the programmed processor. The HTTP microserver has a plurality of interface modules that interface with the plurality of middleware software modules by issuing API calls to the plurality of middleware software module in response to the HTTP request, the API calls implementing the user commands.

Another embodiment of a television set-top box consistent with the invention includes a programmed processor. A browser software segment runs on the programmed processor. A user interface software segment also runs on the programmed processor and receives user commands to select a link using the browser software segment. A network stack receives messages directed to an address from the browser software segment in response to user commands that select selecting links, and issues requests in response thereto directed to the address. A plurality of middleware software modules also run on the programmed processor. A microserver having the address also runs as a software segment on the programmed processor. The microserver has a plurality of interface modules that interfaces with the plurality of middleware software modules by issuing application calls to the plurality of middleware software module in response to the request, the application calls implementing the user commands.

Another television set-top box consistent with the invention includes a programmed processor. A browser software segment runs on the programmed processor. A user interface software segment runs on the programmed processor and receives a user command to select a link using the browser software segment. A TCP/IP network stack receives messages directed to an IP address from the browser software segment in response to the user command selecting a link, and issues an HTTP request in response thereto directed to the IP address. A middleware software module also runs on the programmed processor. An HTTP microserver having an IP address also runs as a software segment on the programmed processor. The HTTP microserver has an interface module that interfaces with the middleware software module by issuing an API call to the middleware software module in response to the HTTP request, the API call implementing the user command. A television tuner hardware driver interfaces to and controls the television tuner hardware driver. A television tuner is provided wherein the user command includes a command to change a selected television channel. The API call directs the middleware software module to change channels and the middleware software module directs the television tuner driver to change a channel tuned by the television tuner.

In yet another embodiment, a television set-top box includes a programmed processor. A browser software segment runs on the programmed processor. A user interface software segment also runs on the programmed processor and receives a user command to select a link using the browser software segment. A TCP/IP network stack receives messages directed to an IP address from the browser software segment in response to the user command selecting a link and issues an HTTP request in response thereto directed to the IP address. A middleware software module also runs on the programmed processor. An HTTP microserver having an IP address also runs as a software segment on the programmed processor. The HTTP microserver has an interface module that interfaces with the middleware module by issuing an API call to the middleware software module in response to the HTTP request, the API call implementing the user command. A segment of lower level software code segment carries out one of a memory write and a memory read operation under the direction of the API call.

In another embodiment, an electronic storage medium storing instructions which, when executed on a programmed processor, carry out a process of controlling local hardware or software using a browser including: directing an HTTP request from a browser to a local HTTP microserver having an IP address; at the HTTP microserver, parsing the HTTP request to identify a target interface module, and directing the HTTP request to the target interface module; and at the target interface module, generating an API call from the HTTP request.

Certain embodiments of the present invention provide a method and apparatus for controlling set-top box hardware and software functions. An HTTP microserver is used to intercept HTTP requests for access to local devices and software. When the HTTP microserver receives a URL from the TCP/IP network stack, it directs instructions to an appropriate interface module that in turn generates an API call for an appropriate middleware module. The middleware module may then appropriately control a lower level software module to effect a software function or to drive hardware.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
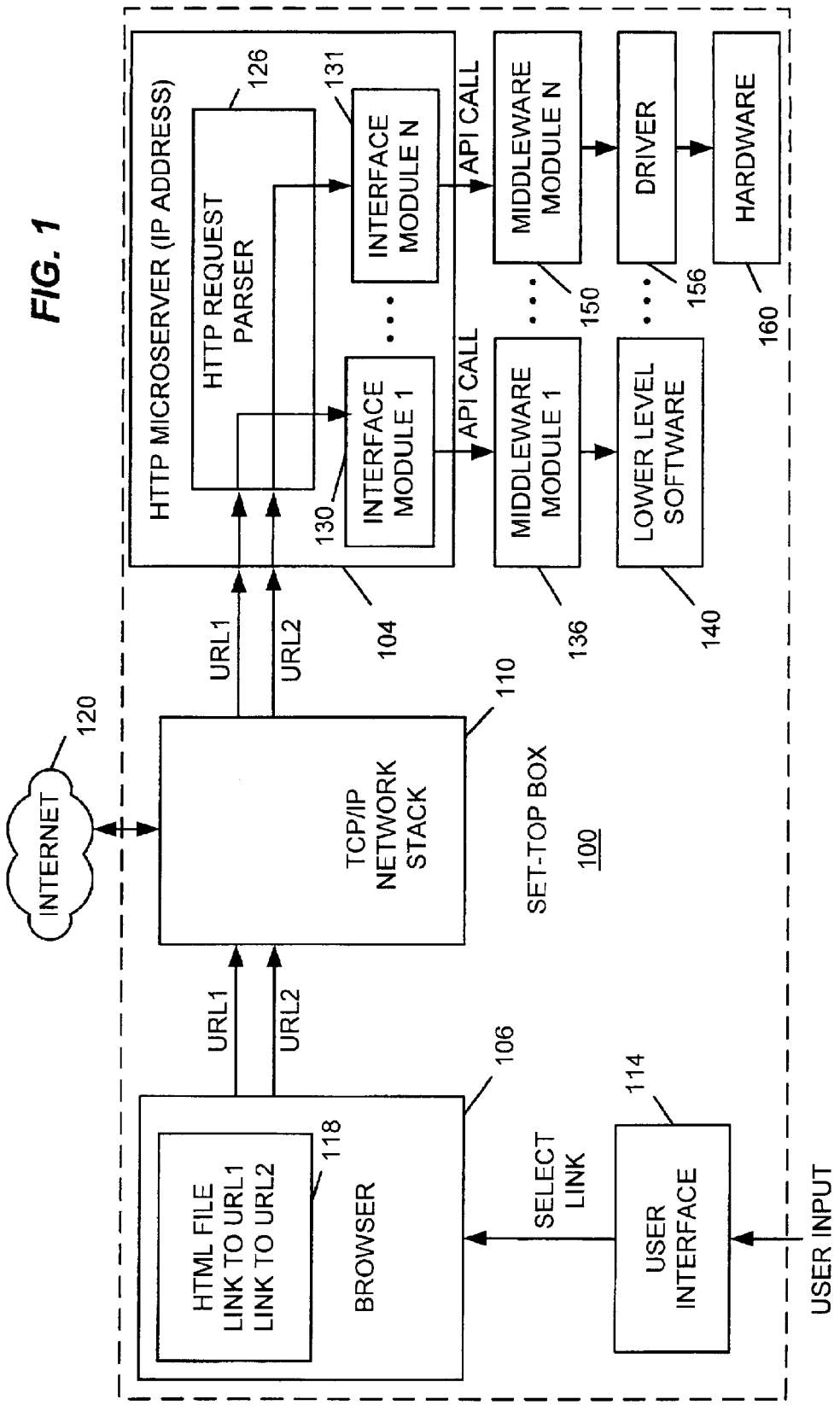
FIG. 1 is a block diagram of the relevant software of an exemplary set-top box using an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

For purposes of this application, the term "lower level software" is intended to embrace any software code segment that operates under the direction of a middleware software layer. The term "local" is intended to embrace hardware and software devices that are a part of the set-top box or are coupled directly to the set-top box and are thus directly addressable by the set-top box. The term "local" is intended to exclude hardware and software that is addressable via an IP address over the Internet.

Referring now to FIG. 1, a set-top box 100 utilizes an HTTP (Hypertext Transfer Protocol) microserver 104 to implement the present invention. HTTP microservers are often provided as part of the real time operating system package. Such microservers are primarily used for remote systems set up in diagnostics to enable access to internal API (Application Program Interface) calls from outside computers via the TCP/IP network. It has basically the same functionality that a regular HTTP server provides. In response to HTTP requests, the HTTP microserver 104 executes server functions and returns the results in an HTML (Hypertext Markup Language) file. The HTTP microserver 104 can form a part of the set-top box software running as a separate task (or equivalently, running on another processor operating in concert). It is possible to access the HTTP microserver 104 from a browser 106 forming a part of the same set-top box software. Such access is accomplished via the set-top boxes TCP/IP network stack 110. This makes it possible for the browser 106 to indirectly access the set-top box 100 software via the HTTP microserver 104. By use of such HTTP microserver, there is no need to modify the browser 106 in order to accomplish control of set-top box hardware and software functions. Although such modifications might require modification to the HTTP microserver, the HTTP microserver 104 code is substantially smaller than that of the browsers code and such code is designed to be easily interfaced with lower level software. Thus, it is substantially easier to modify the microserver then to modify the browser 106.

In operation, a user provides input to the set-top box by interacting with a user interface 114 formed by displaying an HTML page using browser 106. Such HTML page may be contained within an HTML file 118 accessed by the browser 106. When the user interacts with the browser 106 to select a particular link to a Universal Resource Locator (URL), the URLs are transferred to the TCP/IP network stack 110. If the URL address is a normal Internet resource, an HTTP request is transmitted over the Internet 120 in order to access the desired URL. If, however, the URL such as URL1 and URL 2 are directed to a local address, the HTTP request is directed to HTTP microserver 104. Such HTTP requests can take the form of:

http://localhost/dir/func?parameter1=value1&parameter2=value2 wherein "localhost" is the HTTP microservers IP address, "dir" is a file location and "parameter1" and "parameter2" are provided with "value1" and "value2" to be operated upon by the HTTP microserver 104. In one example, parameter1 and parameter2 could represent a television channel number and a name for the channel with the function being a function defining a favorite channel function. In this manner, the HTTP microserver 104 can make a call to lower level software to write to a memory location establishing a channel number and channel name for a favorite channel desired by the user. In other embodiments, parameter1 could represent a channel that the user desires to select with the function being a channel changing function. In this case, the HTTP microserver 104 would interface with a middleware module and hardware driver designed to control television or set-top box tuner. It will be clear to those skilled in the art that numerous other set-top box and television and video appliance functions can be implemented using similar processes.

When the HTTP microserver 104 receives an HTTP request from the TCT/IP network stack 110, an HTTP request parser 126 forming a part of the HTTP microserver directs the HTTP request to a selected one of a plurality of interface modules such as interface module 130 or interface module 131 illustrated. In the case of interface module 130, this interface module is designed to interface with a middleware module 136 via an application program interface call. Middleware module 136 then controls lower level software 140 to implement any number of functions such as memory reads and memory writes that might affect audio or video characteristics for example. In another example, the HTTP request parser 126 may direct an HTTP request to interface module 131 that is designed to interface with middleware module 150 and control a hardware driver 156. This hardware driver is simply another form of lower level software that can implement control over hardware such as hardware device 160. By way of example, and not limitation, driver 156 may be a driver that controls a tuner in the set-top box for implementing channel selection. If the HTTP request is for a channel change, interface module 131 sends an appropriate API call to middleware module 150 which, in turn, causes driver 156 to select a selected channel using tuner hardware 160. Those skilled in the art will appreciate that other hardware can also be controlled using the present invention. Examples of such hardware might include a cable modem, a dial-up modem, a serial or parallel interface or any other suitable hardware forming a part of the set-top box or connected to the set-top box.

Figure 2:
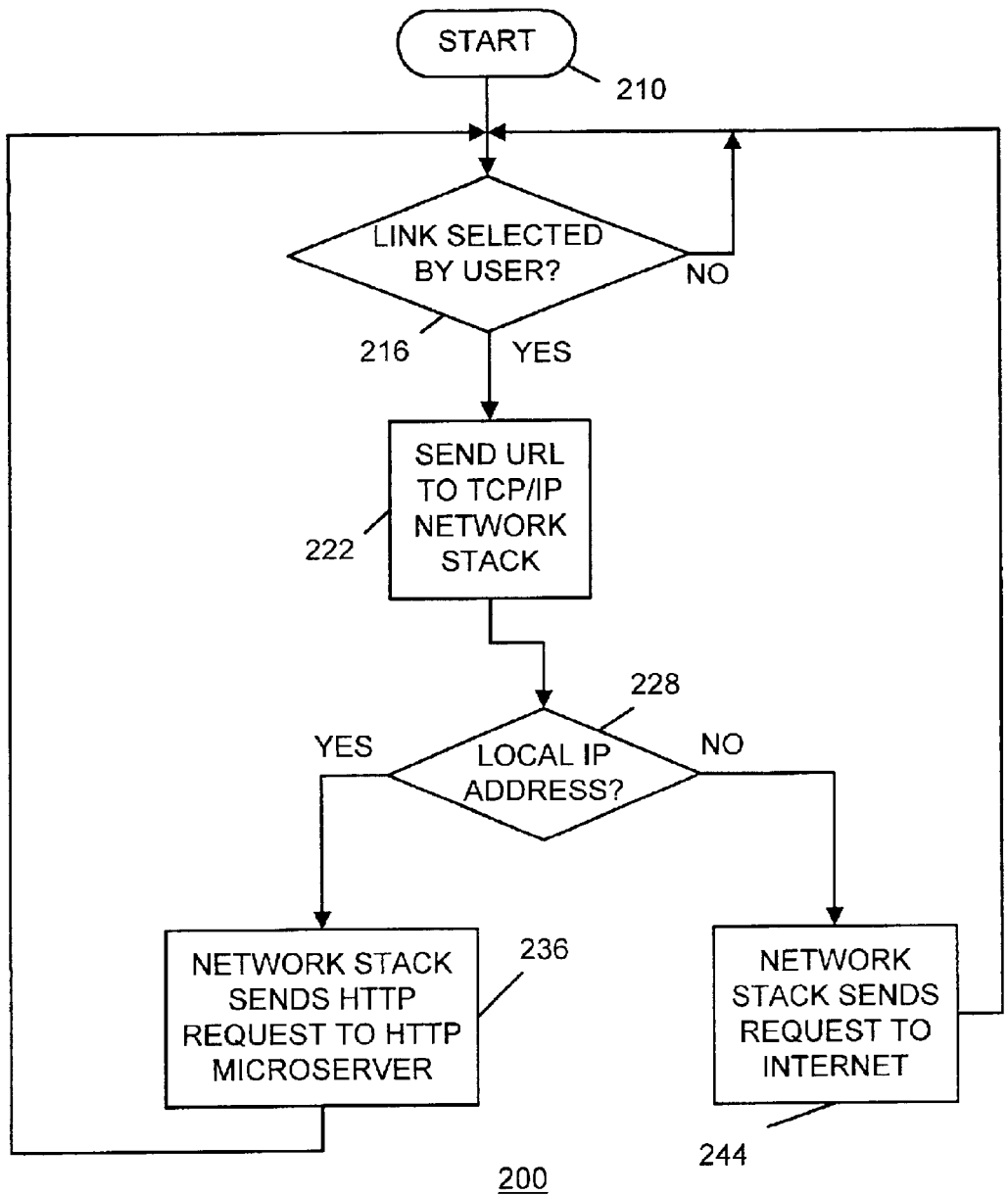
FIG. 2 is a flow chart of an embodiment of the software process carried out in the browser and TCP/IP stack of an embodiment of the present invention.

Referring now to FIG. 2, a process 200 is described starting at 210 with process 200 describing the actions leading up to a HTTP request being sent to HTTP microserver 104. The processor waits the user selection of a particular link at 216. Once that link is selected by the user, a URL is sent to the TCP/IP network stack at 222. If the address in the URL is a local IP address at 228 such as that representing the HTTP microserver, then the TCP/IP network stack 110 sends an HTTP request to microserver 104 at 236 and control returns to 216 until the user selects another link. In the case where the address at 228 is not a local IP address, the network stack sends the HTTP request to the Internet 120 in a normal fashion.

Figure 3:
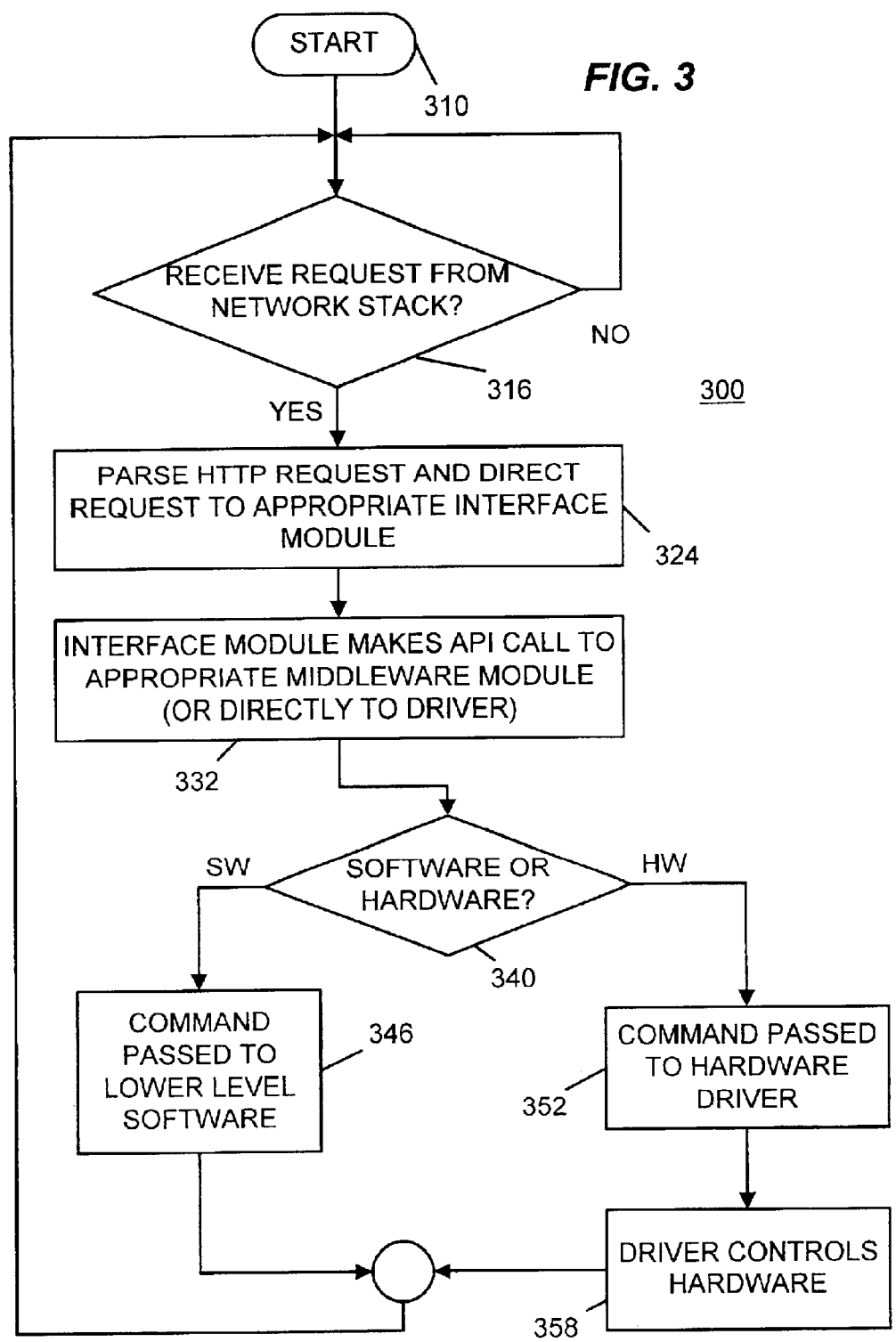
FIG. 3 is a flow chart of an embodiment of the software process carried out in an HTTP microserver, consistent with embodiments of the invention, and beyond as a result of an HTTP request received by the HTTP microserver.

Once an HTTP request is sent to HTTP microserver 104 at 236, process 300 of FIG. 3 is carried out starting at 310. When a request is received from the network stack at 316, the request is parsed by the HTTP request parser 126 and directed to an appropriate interface module at 324. The interface module receiving the request then makes an API call to the appropriate middleware module or alternatively directly to a driver at 332. Depending upon whether the middleware module is ultimately to control hardware or software at 340, a command is either passed to lower level software at 346 or to a hardware driver at 352. If the command is passed to the hardware driver at 352, the driver controls the hardware at 358. In either event, control returns to 316 to await the next request from the TCP/IP network stack at 316.

Of course many variations are possible without departing from the invention. The multiple interface modules 130 through 131 described in conjunction with FIG. 1 may be implemented as a single interface module or may be implemented as many interface modules as depicted. Moreover, similar implementation can be carried out for the middleware modules 136 and 150. Other variations will occur to those skilled in the art including variations of use of other mark-up languages and other protocols besides HTML and TCP/IP as described herein. While the invention has been described in conjunction with an interface to a television set-top box, similar functionality can be implemented within a television set itself. Such an implementation should be considered equivalent.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, multiple processors operating in concert, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form which can be stored on any suitable electronic storage medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of controlling local hardware or software using a browser, comprising:
   directing an HTTP request from a browser to a local HTTP microserver having an IP address;
   at the local HTTP mioroserver, parsing the HTTP request to identify a target interface module, and directing the HTTP request to the target interface module;
   at the target interface module, generating an API call from the HTTP request;
   sending the API call to a middleware software module, wherein the middleware software module controls a lower level software code segment that comprises a television tuner driver;
   controlling a television tuner using the television tuner driver; and
   wherein the HTTP request from the browser comprises a request to change a television channel and the API call directs the television tuner driver to change the television channel selected by the television tuner.

2. The method of claim 1, wherein the lower level software code segment carries out memory write operations under the direction of the API call.

3. The method of claim 1, wherein the HTTP request is directed to the HTTP microserver by a network stack.

4. The method of claim 3, wherein the network stack comprises a TCP/IP network stack.

5. A method of controlling local hardware or software using a browser, comprising:

directing a request from a browser to a local microserver having an address;

at the local microserver, parsing the request to identify a target interface module, and directing the request to the target interface module; and at the target interface module, generating an application call from the request;

sending the application call to a middleware software module, wherein the middleware software module controls a lower level software code segment comprising a television tuner driver;

controlling a television tuner using the television tuner driver; and wherein the request from the browser comprises a request to change a television channel and the application call directs the television tuner driver to chance the television channel selected by the television tuner.

6. The method of claim 5, wherein the lower level software code segment carries out memory write operations under the direction of the application call.

7. The method of claim 5, wherein the request comprises an HTTP request and wherein the microcserver comprises an HTTP microserver and wherein the HTTP request is directed to the HTTP microserver by a network stack.

8. The method of claim 7, wherein the network stack comprises a TCP/IP network stack.

9. A television set-top box, comprising:

a programmed processor;

a browser software segment running on the programmed processor;

a user interface software segment running on the programmed processor that receives a user command to select a link using the browser software segment;

a network stack receiving messages directed to an IP address from the browser software segment in response to the user command selecting a link, and issuing an HTTP request in response thereto directed to the IP address;

a middleware software module running on the programmed processor; and an HTTP microserver having an IP address and running as a software segment on the programmed processor, the HTTP microserver comprising an interface module that interfaces with the middleware software module by issuing an API call to the middleware software module in response to the HTTP request, the API call implementing the user command.

10. The television set-top box of claim 9, further comprising a hardware driver, and wherein the middleware software module interfaces to and controls the hardware driver.

11. The television set-top box of claim 10, further comprising a television tuner, and wherein the hardware driver comprises a television tuner hardware driver.

12. The television set-top box of claim 11, wherein the user command comprises a command to change a selected television channel, the API call directs the middleware software module to change channels and the middleware software module directs the television tuner driver to change a channel tuned by the television tuner.

13. The television set-top box of claim 9, further comprising a segment of lower level software code and wherein the lower level software code segment carries out memory write operations under the direction of the API call.

14. The television set-lop box of claim 9, further comprising a segment of lower level software code and wherein the lower level software code segment carries out memory read operations under the direction of the API call.

15. The television set-top box of claim 9, wherein the network stack comprises a TCP/IP network stack.

16. A television set-top box, comprising:

a programmed processor;

a browser software segment running on the programmed processor;

a user interface software segment running on the programmed processor that receives user commands to select a link using the browser software segment;

a network stack receiving messages directed to an IP address from the browser software segment in response to user commands that select links, and issuing HTTP requests in response thereto directed to the IP address;

a plurality of middleware software modules running on the programmed processor; and an HTTP microserver having an IP address and running as a software segment on the programmed processor, the HTTP microserver comprising a plurality of interface modules that interfaces with the plurality of middleware software modules by issuing API calls to the plurality of middleware software modules in response to the HTTP request, the API calls implementing the user commands.

17. The television set-top box of claim 16, further comprising a hardware driver, and wherein one of the middleware software modules interfaces to and controls the hardware driver.

18. The television set-top box of claim 17, further comprising a television tuner, and wherein the hardware driver comprises a television tuner hardware driver.

19. The television set-top box of claim 18, wherein one of the user commands comprises a command to change a selected television channel, and wherein one of the API calls directs the one of the middleware software modules to change channels and the one of the middleware software modules directs the television tuner driver to change a channel tuned by the television tuner.

20. The television set-top box of claim 16, further comprising a segment of lower level software code and wherein the lower level software code segment carries out memory write operations under the direction of one of the API calls.

21. The television set-top box of claim 16, further comprising a segment of lower level software code and wherein the lower level software code segment carries out memory read operations under the direction of the API call.

22. The television set-top box of claim 16, wherein the network stack comprises a TCP/IP network stack.

23. The television set-top box of claim 16, further comprising an HTTP request parser receiving the HTTP requests and selecting one of the plurality of interface modules to direct the HTTP request.

24. A television set-top box, comprising:

a programmed processor;

a browser software segment running on the programmed processor;

a user interface software segment running on the programmed processor that receives user commands to select a link using the browser software segment;

a network stack receiving messages directed to an address from the browser software segment in response to user commands that select links, and issuing requests in response thereto directed to the address;

a plurality of middleware software modules running on the programmed processor; and a microserver having the address and running as a software segment on the programmed processor, the microserver comprising a plurality of interface modules that interfaces with the plurality of middleware software modules by issuing application calls to the plurality of middleware software modules in response to the requests, the application calls implementing the user commands.

25. The television set-top box of claim 24, further comprising a hardware driver, and wherein one of the middleware software modules interfaces to and controls the hardware driver.

26. The television set-top box of claim 25, further comprising a television tuner, and wherein the hardware driver comprises a television tuner hardware driver.

27. The television set-top box of claim 26, wherein one of the user commands comprises a command to change a selected television channel, and wherein one of the application calls directs the one of the middleware software modules to change channels and the one of the middleware software modules directs the television tuner driver to change a channel tuned by the television tuner.

28. The television set-top box of claim 24, further comprising a segment of lower level software code and wherein the lower level software code segment carries out memory write operations under the direction of one of the application calls.

29. The television set-top box of claim 24, further comprising a segment of lower level software code and wherein the lower level software code segment carries out memory read operations under the direction of the application call.

30. The television set-top box of claim 24, wherein the network stack comprises a TCP/IP network stack.

31. The television set-top box of claim 24, further comprising a request parser receiving the requests and selecting one of the plurality of interface modules to direct the request.

32. A television set-top box, comprising:

a programmed processor;

a browser software segment running on the programmed processor;

a user interface software segment running on the programmed processor that receives a user command to select a link using the browser software segment;

a TCP/IP network stack receiving messages directed to an IP address from the browser software segment in response to the user command selecting a link and issuing an HTTP request in response thereto directed to the IP address;

a middleware software module running on the programmed processor;

an HTTP microserver having an IP address and running as a software segment on the programmed processor, the HTTP microserver comprising an interface module that interfaces with the middleware software module by issuing an API call to the middleware software module in response to the HTTP request, the API call implementing the user command;

a television tuner hardware driver, wherein the middleware software module interfaces to and controls the television tuner hardware driver;

a television tuner; and wherein the user command comprises a command to change a selected television channel, the API call directs the middleware software module to change channels and the middleware software module directs the television tuner driver to change a channel tuned by the television tuner.

33. A television set-top box, comprising:

a programmed processor;

a browser software segment running on the programmed processor;

a user interface software segment running on the programmed processor that receives a user command to select a link using the browser software segment;

a TCP/IP network stack receiving messages directed to an IP address from the browser software segment in response to the user command selecting a link, and issuing an HTTP request in response thereto directed to the IP address;

a middleware software module running on the programmed processor; and an HTTP microserver having an IP address and running as a software segment on the programmed processor, the HTTP microserver comprising an interface module that interfaces with the middleware module by issuing an API call to the middleware software module in response to the HTTP request, the API call implementing the user command;

a segment of lower level software code and wherein the lower level software code segment carries out one of a memory write and a memory read operation under the direction of the API call.

34. An electronic storage medium storing instructions which, when executed on a programmed processor, carry out a process of controlling local hardware or software using a browser, comprising:

directing an HTTP request from a browser to a loyal HTTP microserver having an IP address;

at the local HTTP microserver, parsing the HTTP request to identify a target interface module, and directing the HTTP request to the target interface module; and at the target interface module, generating an API call from the HTTP request;

sending the API call to a middleware software module, wherein the middleware software module controls a lower level software code segment comprising a television tuner driver;

controlling a television tuner device using the television tuner driver; and wherein the HTTP request from the browser comprises a request to change a television channel and the API call directs the television tuner driver to change the television channel selected by the television tuner.

35. The electronic storage medium of claim 34, wherein the lower level software code segment carries out memory write operations under the direction of the API call.

36. The electronic storage medium of claim 34, wherein the HTTP request is directed to the HTTP microserver by a network stack.

37. The electronic storage medium of claim 34, wherein the network stack comprises a TCP/IP network stack.

* * * * *